Aug. 20, 1957 A. E. TILLEY 2,803,809
METHOD AND APPARATUS FOR TIMING SEISMIC RECORDINGS
Filed May 18, 1954
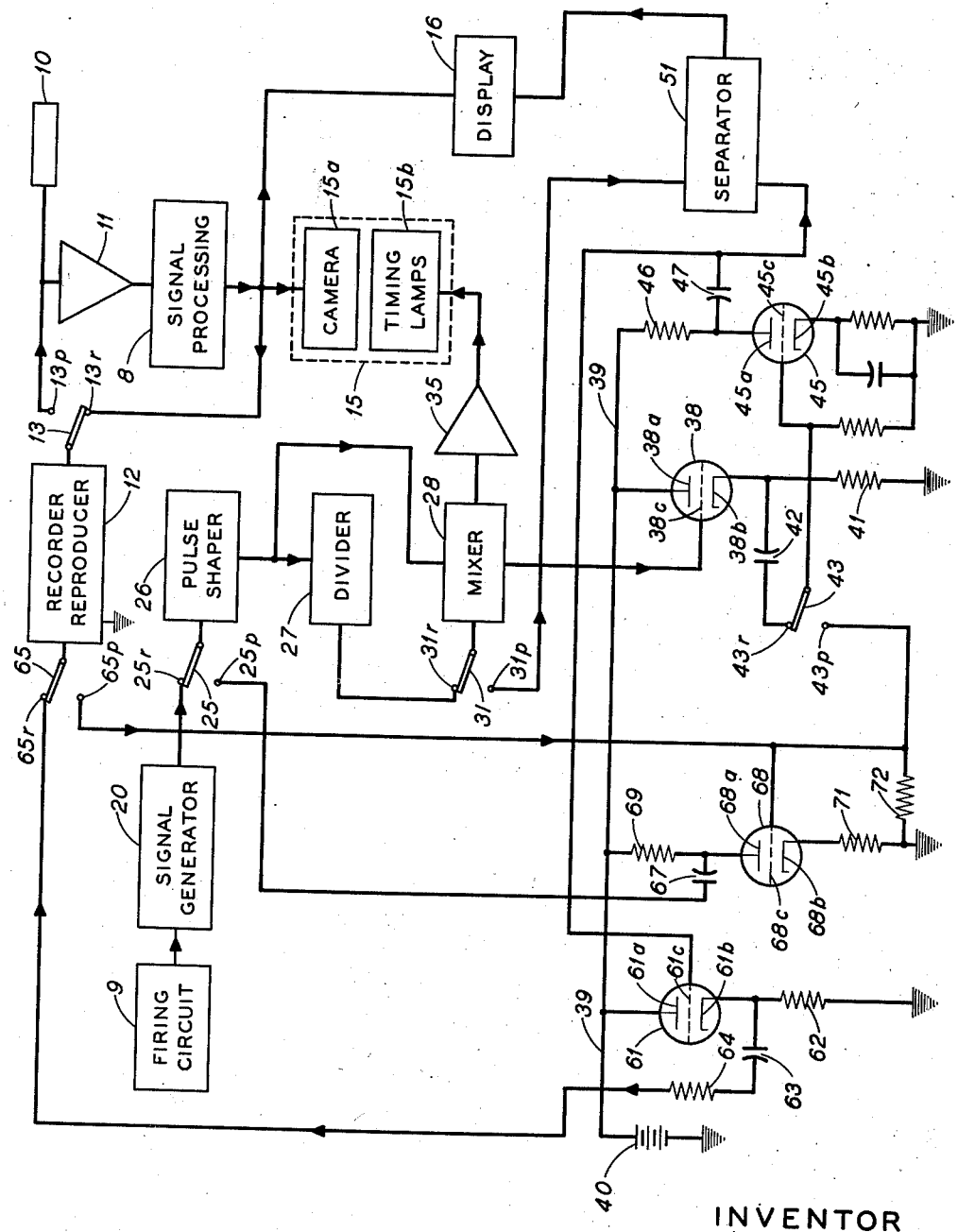
INVENTOR
AUBRA E. TILLEY
BY
ATTORNEYS

United States Patent Office 2,803,809
Patented Aug. 20, 1957

2,803,809

METHOD AND APPARATUS FOR TIMING SEISMIC RECORDINGS

Aubra E. Tilley, Fullerton, Calif., assignor to California Research Corporation, San Francisco, Calif., a corporation of Delaware Application May 18, 1954, Serial No. 430,593

3 Claims. (Cl. 340—15)

This invention relates in general to seismic prospecting, and relates more specifically to the recording and analysis of seismic detector signals.

In the seismic prospecting art, the mechanical energy of seismic waves artifically generated in the ground is translated by means of a plurality of seismic wave detectors into electrical impulses varying in sympathy with such waves, and these impulses are amplified and recorded in some manner for analysis. It is desirable to record the resulting impulses on both a permanent record and on some type of reproducible recording medium, such as a photographic medium or a magnetizable medium, on which the desired information may be recorded and subsequently withdrawn a number of times. The reproducibly-recorded signals may then be subsequently played back and modified in a number of different ways by changing different parameters, for comparison with the original signals. A permanent record is usually made of the resulting modified signals from the reproducible recording medium, and the resulting modified signals may also be transitorily recorded on some type of oscilloscopic display means to permit rapid visual evaluation of the effect on the signals of variations in the different parameters.

In the analysis of such records, it is essential that an accurate time reference be provided so that reflections or other events appearing on one of the records may be accurately correlated with the corresponding reflection or other events on the other records and/or on the display medium.

Briefly, the present invention contemplates methods and apparatus for recording seismic detector signals in which the signals are recorded simultaneously on a permanent record and on a reproducible recording medium and in which an accurate, common timing signal is provided on each of the records. This common timing signal is then available for use throughout the subsequent analysis of the records and the analysis of records made from the reproducibly-recorded record.

It is, therefore, an object of the present invention to provide an improved method and apparatus for recording seismic detector signals.

It is a further object of this invention to provide methods and apparatus for recording and analyzing seismic detector signals in which a common timing reference is recorded simultaneously with the seismic detector signals on a permanent record and on a reproducible recording medium to provide a reference for subsequent time correlation of the information contained in the two records.

It is an additional object of the present invention to provide improved methods and apparatus for recording seismic detector signals in which a common timing reference is provided on both a permanent record and on a reproducible recording medium containing the seismic detector signals and in which the common timing reference is available for subsequent time correlation of the signals on the records and on records subsequently produced from the reproducible record.

Objects and advantages other than those outlined above will readily be apparent from the following description when read in connection with the accompanying drawing, the single figure of which illustrates one embodiment of the present invention.

Referring to Fig. 1 by character of reference, numeral 9 designates a firing circuit or other suitable means for initiating an explosion or other source of seismic waves in the earth. A seismic detector 10 generates an electrical signal varying in sympathy with variations in the movement of the earth in response to these seismic waves. Although, for simplicity, only one seismic detector has been illustrated, it will be obvious that in practice a considerable number of such detectors are usually used, and such detectors may be arranged in any desirable pattern or configuration.

The output signal from detector 10 is supplied to suitable amplifying means 11. The output of amplifier 11 is supplied to means shown schematically at 8 for processing the signal in different ways prior to recording or display. Such processing may include filtering and/or combining the signals from the different detectors to produce a composite signal, as is well known in the art. The output of processing means 8 is supplied through a contact 13r of a selector switch 13 to a reproducible recording medium 12, such as a magnetic tape recorder having recording heads thereon for variably magnetizing the tape in accordance with variations in the signals supplied to the recording heads, and having a plurality of pickup or reproducing heads for withdrawing information from the tape.

Simultaneously with the recording of the output of means 8 on the recorder 12, the output of means 8 is also utilized to produce a permanent record of the variations in the output of detector 10. Such a permanent record may be obtained by impressing the output of processing means 8 upon a suitable photographic device 15 having a camera portion 15a in which the intensity of a light source is modulated in accordance with variations in the signal from detector 10 to produce a record of such variations on a strip of photosensitive paper, as is well known in the art. Device 15 is also provided with a portion 15b for producing a series of reference timing marks on the photographic record, as will be explained more fully below. The output of signal processing means 8 may also be supplied to suitable display means 16, such as a cathode ray oscilloscope, for displaying the seismic detector signal.

In accordance with the present invention, a source of timing signals is impressed simultaneously upon the records being made by recorder 12 and camera 15, and this common timing reference may subsequently be used to time accurately events occurring on the two records or on records made from the original records. In the embodiment illustrated in Fig. 1, a device 20 is provided to generate a signal having a suitable shape, such as sine wave of predetermined frequency. Generator 20 may be connected to firing circuit 9 to control the operation of the generator. The output from generator 20 is supplied through the contact 25r of a selector switch 25 to a shaping circuit including a pulse shaper 26 where the sine wave is shaped into a series of pips or spikes of negligible duration and separated from each other by a suitable time interval, such as 0.01 second.

The output of shaper 26 is impressed simultaneously on a divider 27 and a mixer 28. Divider 27 operates to divide the number of pips from shaper 26 by a suitable integer to produce at the output of divider 27 a series of pips of amplitude greater than the pips from shaper 26 and separated from each other by an interval which is the selected integral multiple of the separation of the pulses from shaper 26. In a practical embodiment of the invention, divider 27 could be adapted to produce pips of amplitude greater than the pips from shaper 26 and separated from each other by an interval of 0.1 second.

The output of divider 27 is connected through the contact 31r of a selector switch 31 to the input of mixer 28, where the signals from shaper 26 and divider 27 are mixed and synchronized to produce an output consisting of a series of pulses separated by a time interval of 0.01 second and with every tenth pulse, corresponding to a time interval of 0.1 second, being of a larger amplitude than the intermediate pulses.

The output from mixer 28 is impressed upon an amplifier 35 where the series of pulses is amplified and supplied to component 15a of device 15. In component 15a, these pulses modulate the light from a suitable source to produce a series of timing signals on the photosensitive medium on which the seismic detector signals are recorded. Component 15a is preferably of the type producing a width-modulated pulse on the film, so that the timing signal produced on the film by the pulses from mixer 28 consists of thin lines or marks every 0.01 second and a wider mark at 0.1 second.

The output from mixer 28 is also impressed on the grid 38c of an amplifying tube 38 having an anode 38a and a cathode 38b. Anode 38a is connected to a conductor 39 which is, in turn, connected to the positive terminal of a suitable source of plate voltage, such as a battery 40. A resistor 41 is connected between cathode 38b and ground, and the junction of cathode 38b and resistor 41 is coupled through a capacitor 42 and contact 43r of a selector switch 43 to the grid 45c of a vacuum tube 45 having an anode 45a and a cathode 45b. Anode 45a is connected through a resistor 46 to conductor 39, and the common terminal of resistor 46 and anode 45a is connected to a capacitor 47.

The other terminal of capacitor 47 is connected to the grid 61c of a vacuum tube 61 having an anode 61a and a cathode 61b. Tube 61 is connected for cathode follower operation with a resistor 62 connected between cathode 61b and ground. The output of this cathode follower circuit is connected through a capacitor 63, a resistor 64, and contact 65r of a selector switch 65 to a recording head of recording means 12. The output from mixer 28 is thus amplified through tubes 38, 45, and 61, and impressed upon a recording head of the recorder 12 to produce on the reproducible record a series of timing marks synchronized with the timing marks on the photographic record produced by device 15.

Capacitor 47 is also connected to one input terminal of a device 51 for separating signals of different amplitude. The other input terminal of device 51 is connected through contact 31p of switch 31 to mixer 28, and device 51 compares the signal from mixer 28 with the signal from tube 45 and supplies an output to display device 16, for a purpose which will be more fully explained below.

Selector switches 13, 25, 31, 42 and 65 are preferably ganged together for common actuation, and each switch is provided with two operating positions. The position of each of the selector switches indicated by the subscript "r" corresponds to the position of the switch during recording of the seismic signals. The position of each switch designated by the subscript "p" indicates the position of the switch during playback of the reproducible record. Terminal 13p of switch 13 connects the seismic signal output of recorder 12 to amplifier 11, where the signal is amplified and supplied to signal processing means 8. Terminal 25p of selector switch 25 connects the input of pulse shaper 26 through a capacitor 67 to the anode 68a of a vacuum tube 68 having a cathode 68b and a grid 68c. Anode 68a is connected through a resistor 69 to the common plate supply conductor 39, and cathode 68b is conected through a pair of resistors 71 and 72 to grid 68c and the commonly-connected terminals 43p and 65p of selector switches 43 and 65. Terminal 31p of selector switch 31 connects the output of mixer 28 to an input terminal of separator device 51.

The operation of the invention as described above is as follows. Upon actuation of firing circuit 9, the explosives or other source of seismic energy are activated to generate seismic waves in the earth. As shown in the drawing, generator 20 is preferably connected to firing circuit 9 to synchronize the generator with the firing of the explosives. This synchronization may be such that the firing, or "time break," occurs at a time corresponding to generation of a 0.1 second timing marker by generator 20, thereby facilitating time correlation with the "time break" of subsequent events on the record.

Upon activation, generator 20 supplies to shaper 26 a suitable signal which is shaped in shaper 26 and impressed on divider 27 and mixer 28 to produce a series of marker pips at the output of mixer 28.

These timing pips are amplified by amplifier 35 and impressed on device 15b to produce a series of timing marks on the photographic record, substantially as described above. The output of mixer 28 is also impressed through tubes 38, 45, and 61 on one channel of the reproducible recording medium 12 to produce thereon a series of timing marks synchronized with the timing marks on the photographic film. The output from detector 10 is supplied through amplifier 11 and signal processing means 8 to recording medium 12 and photographic device 15a simultaneously with the common reference timing marks to produce on the recording medium 12 and on the film the timing marks and a record of the variations of the detector signal.

To play back the recording from recording medium 12 and modify the signals thereon for display or for producing a photographic record of the modified signals, switches 13, 25, 31, 43 and 65 are moved to the position to close their respective playback contacts, 13p, 25p, 31p, 43p and 65p. Closure of contact 65p connects the pickup head for the timing marks on recording medium 12 to grid 68c of tube 68 so that the signal from this pickup head is transmitted through tube 68, capacitor 67, and contact 25p of selector switch 25 to shaper 26. Shaper 26 thus has supplied thereto a series of timing pulses substantially identical to those originally produced at the output of mixer 28 by the shaping circuit. The reproduced timing signals are sharpened in the shaping circuit to insure substantial identity of this signal with the original timing signal generated by the circuit. Shaper 26 transmits these pulses to mixer 28, and mixer 28, in turn, supplies pulses through amplifier 35 to component 15b of device 15 to produce on the film a series of timing signals synchronized with the timing signals which appeared on the film during the original recording of the seismic signals.

Mixer 28 also supplies this series of timing pulses through contact 31p of selector switch 31 to an input terminal of separator 51. Separator 51 also has supplied thereto the output voltage of tube 45, which voltage is the amplified timing signal from the recording medium 12. Separator 51 operates to compare the two input signals supplied thereto in a manner to separate the timing marks corresponding to the 0.01 second intervals, leaving only the 0.1 second marks. These 0.1 second marks are supplied to display device 16 to produce corresponding timing lines on the display. The time interval measured by the 0.1 pulses supplied to display means 16 represents sufficient accuracy on a time scale for display purposes, since the display device is not usually used for measurements accurate beyond this interval, and additional timing lines would tend to render the displayed seismic detector signals confusing.

The recording on device 12 may thus be played back through amplifier 11 and modified in a suitable manner by signal processing device 8 to produce a permanent record in camera 15 and/or a display of the signals on device 16. All of the records produced have a common synchronous time reference, and this reference may be utilized to accurately time events occurring on the records.

Although but one embodiment of the present invention has been illustrated and described, it will be apparent to those skilled in the art that various changes and modifications may be made therein without departing from the spirit of the invention or the scope of the appended claims.

I claim:

1. Apparatus for recording and analyzing a seismic detector signal comprising means for generating a reference timing signal, a first recording medium, a second recording medium, means for recording said reference timing signal and said seismic detector signal on both said first and said second recording media, means for reproducing said detector signal and said timing signal from said first recording medium, means for modifying said reproduced seismic detector signal, and means for recording said modified seismic detector signal and said reproduced timing signal on said second recording medium, whereby said original seismic detector signal and said modified seismic detector signal are both recorded on said second recording medium and may be compared on the basis of a common timing signal.

2. Apparatus for recording and analyzing a seismic detector signal comprising means for generating a reference timing signal, a reproducible recording medium, a photographic recording medium, means for recording said reference timing signal and said seismic detector signal on both said reproducible recording medium and said photographic recording medium, means for reproducing said detector signal and said timing signal from said reproducible recording medium, means for modifying said reproduced seismic detector signal, and means for recording said modified seismic detector signal and said reproduced timing signal on said photographic recording medium, whereby said original seismic detector signal and said modified seismic detector signal are both recorded on said photographic recording medium and may be compared on the basis of a common timing signal.

3. Apparatus for recording and analyzing a seismic detector signal comprising means for generating an electrical voltage of constant frequency, a shaping circuit connected to said generating means for producing a series of reference timing pulses from said voltage, a reproducible recording medium, a permanent recording medium, means for recording said reference timing pulses and said seismic detector signal on both said reproducible recording medium and said permanent recording medium, means for reproducing said detector signal and said pulses from said reproducible recording medium, signal modifying means for modifying said reproducible seismic detector signal, means for supplying said reproduced timing pulses to said shaping circuit to sharpen the edges of said reproduced timing pulses, and means for recording said modified seismic detector signal and said reproduced sharpened timing pulses on said permanent recording medium, whereby said original seismic detector signal and said modified seismic detector signal are both recorded on said permanent recording medium and may be compared on the basis of the common timing pulses.

References Cited in the file of this patent

UNITED STATES PATENTS

| | | |
|---|---|---|
| 2,427,421 | Rieber | Sept. 16, 1947 |
| 2,638,402 | Lee | May 12, 1953 |
| 2,658,579 | Rieber | Nov. 10, 1953 |
| 2,672,944 | Minton | Mar. 23, 1954 |